(12) United States Patent
Wallevik et al.

(10) Patent No.: US 7,763,221 B2
(45) Date of Patent: Jul. 27, 2010

(54) PROCESS FOR COMPLETE UTILISATION OF OLIVINE CONSTITUENTS

(75) Inventors: Oddmund Wallevik, Skien (NO); Tom Rames Jørgensen, Porsgrunn (NO); Aage Aasheim, Skien (NO); Birger Langseth, Porsgrunn (NO)

(73) Assignee: Cod Technologies A.S., Porsgrunn (NO)

( * ) Notice: Subject to any disclaimer, the term of this patent is extended or adjusted under 35 U.S.C. 154(b) by 436 days.

(21) Appl. No.: 11/630,835

(22) PCT Filed: Jun. 6, 2005

(86) PCT No.: PCT/NO2005/000190

§ 371 (c)(1),
(2), (4) Date: Apr. 11, 2007

(87) PCT Pub. No.: WO2006/001700

PCT Pub. Date: Jan. 5, 2006

(65) Prior Publication Data

US 2008/0075645 A1    Mar. 27, 2008

(30) Foreign Application Priority Data

Jun. 23, 2004    (NO) ................................ 20042644

(51) Int. Cl.
*C01G 1/00*    (2006.01)

(52) U.S. Cl. .................... 423/140; 423/150.1; 423/155; 423/169

(58) Field of Classification Search ................ 423/140, 423/150.1, 155, 169
See application file for complete search history.

(56) References Cited

U.S. PATENT DOCUMENTS

| | | | |
|---|---|---|---|
| 2,549,798 A * | 4/1951 | Gee et al. | ................... 423/158 |
| 4,800,003 A | 1/1989 | Peacey et al. | |
| 4,944,928 A | 7/1990 | Grill et al. | |
| 5,091,161 A | 2/1992 | Harris et al. | |
| 5,120,514 A * | 6/1992 | Tveten et al. | ............... 423/155 |
| 5,780,005 A | 7/1998 | Olerud | |
| 5,980,854 A | 11/1999 | White et al. | |
| 6,270,679 B1 * | 8/2001 | Kreisler | ...................... 210/710 |
| 7,399,454 B2 * | 7/2008 | Koningen et al. | ........ 423/150.3 |

FOREIGN PATENT DOCUMENTS

| | | |
|---|---|---|
| SU | 104885 | 11/1955 |
| WO | 02/48036 | 6/2002 |

\* cited by examiner

*Primary Examiner*—Melvin C Mayes
*Assistant Examiner*—Melissa Stalder
(74) *Attorney, Agent, or Firm*—Wenderoth, Lind & Ponack, L.L.P.

(57) ABSTRACT

A novel process for complete utilization of olivine is based on purification of brine by oxidation and precipitation of iron and nickel compounds.

13 Claims, 8 Drawing Sheets

Purification of olivine brine through air oxidation, leaching, and precipitation of Ni in two steps Fig. 1: Silica production

Fig. 3: Purification of olivine brine through air oxidation, leaching, and precipitation of Ni in two steps

PROCESS FOR COMPLETE UTILISATION OF OLIVINE CONSTITUENTS

FIELD OF THE INVENTION

The invention concerns a process for complete utilisation of olivine constituents, and more particularly a process, apart from production of silica, also resulting in iron and nickel products that can be utilized for production of iron and nickel. High purity magnesium chloride solution from olivine is produced. Furthermore, the process is conducted without any deposits at all.

BACKGROUND OF THE INVENTION

Production of silica from olivine is generally covered by the co-pending Norwegian Patent Application No. 20040167.

Olivine is a natural magnesium iron silicate available in large quantities at many locations in the world. Typically it contains about 50% magnesia, about 40% silica and about 7-9% iron oxide. The olivine can contain up to 10% of accessory minerals (e.g., pyroxene, spinel, chromite and chlorite). Olivine is easily soluble in acid and it has for a long time been considered as a raw material for magnesium chemicals and silica.

U.S. Pat. No. 5,780,005 (Olerud) describes a process for production of silica from olivine, but does not mention utilisation of the remaining part of the raw material. There are several patents (e.g. WO02/48036 A1) related to the silica production ignoring utilization of remaining compounds in the olivine raw material. In order to have an economic viable process, all compounds in olivine should be utilised.

Icelandic Patent Application no. 6635 discloses production of precipitated silica with controlled specific surface area and high degree of purity. The disclosed process comprises mixing in a controlled manner olivine and a hot mineral acid solution and thereafter separating most of the undissolved olivine and accessory compounds. Resulting silica slurry is then filtered to recover the metal salt solution and the silica washed to remove dissolved salt.

The acidic metal salt solution separated from the precipitated silica and undissolved compounds, contains magnesium, iron and nickel, in addition to minor quantities of other elements, as for example manganese and aluminum. If this magnesium containing solution is to be used for the production of magnesium metal, magnesium oxide and other magnesium chemicals, it has to be purified by suitable known methods. Several methods have been described in e.g.:

U.S. Pat. No. 4,944,928 (Norsk Hydro)

K. B. Bengtson, Light Metals 1999, pp 1151-1154

U.S. Pat. No. 5,091,161 (Magnola process)

In the above purification methods a precipitate containing iron and other metallic impurities is precipitated from the magnesium salt solution. The precipitate contains nickel, which can make waste disposal costly. U.S. Pat. No. 4,944,928 also discloses a process for removal of small amounts of Ni from magnesium chloride solution, which is also applied in the present invention.

OBJECTS OF THE INVENTION

The main object of this invention is to provide a process for the complex and efficient utilisation of olivine, providing no waste, and in which high value silica, magnesium chloride solution and iron and nickel compounds are obtained as the main products.

A further object of the present invention is to provide a method for production of concentrated metal chloride solution from the olivine and to provide a process for purification of such obtained metal chloride solution.

Another object is to provide a method for purification of the metal chloride solution resulting in magnesium chloride solution of sufficient purity for magnesium metal production.

It is a further object of the invention to provide a process for an efficient separation of nickel from metal oxide precipitate obtained in the purification process of the metal chloride solution, so that commercial quality iron and nickel compounds can be obtained.

Still another object of the present invention is to produce a sand product that can be utilised for various purposes, avoiding costs related to waste disposal as in the presently known processes of production of silica from olivine.

BRIEF DESCRIPTION OF THE DRAWINGS

The process will now be described in details referring to FIGS. 1-8, where.

DETAILED DESCRIPTION OF THE INVENTION

Figure 1:
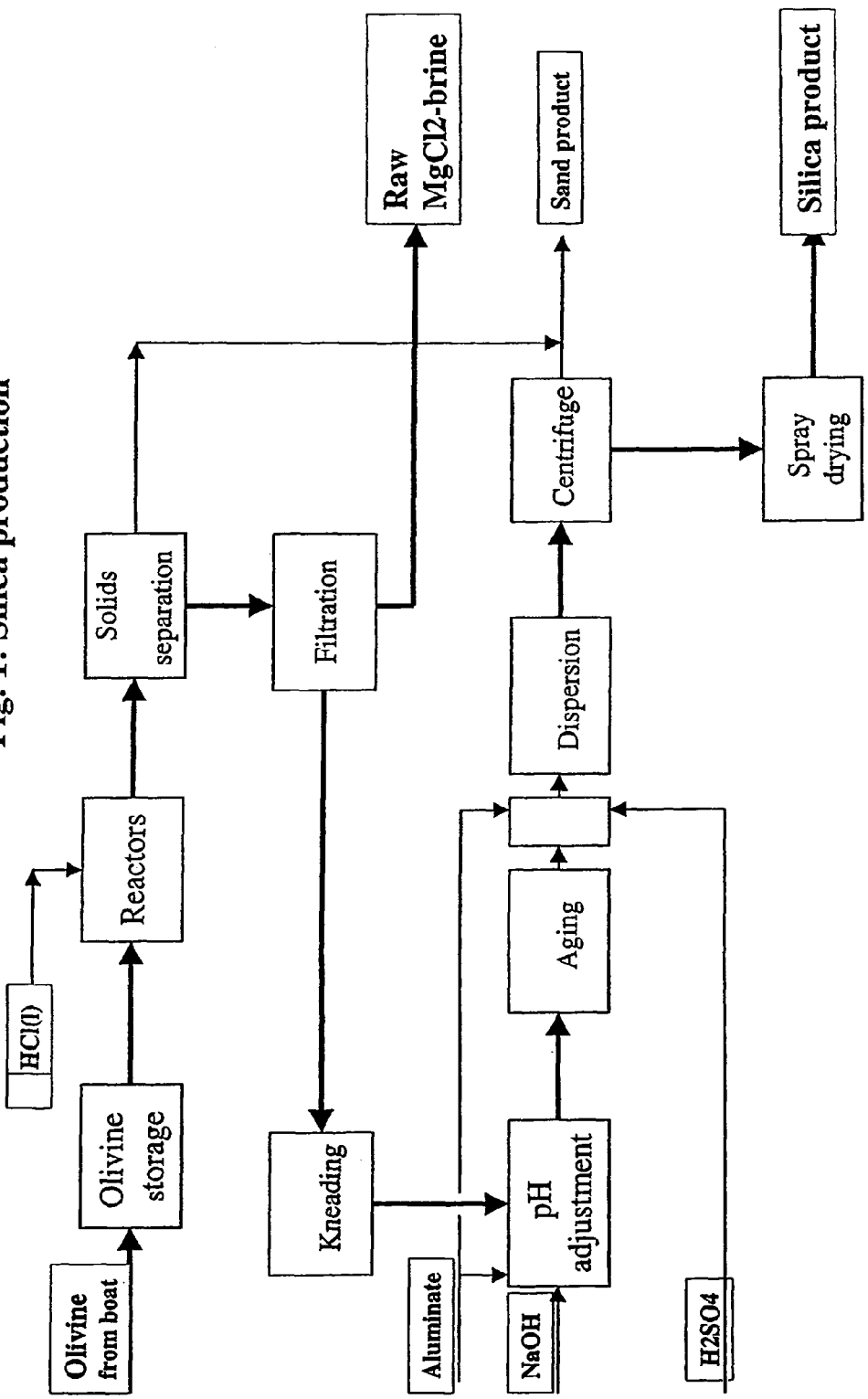
FIG. 1 Shows a block diagram of the silica process.
Figure 2:
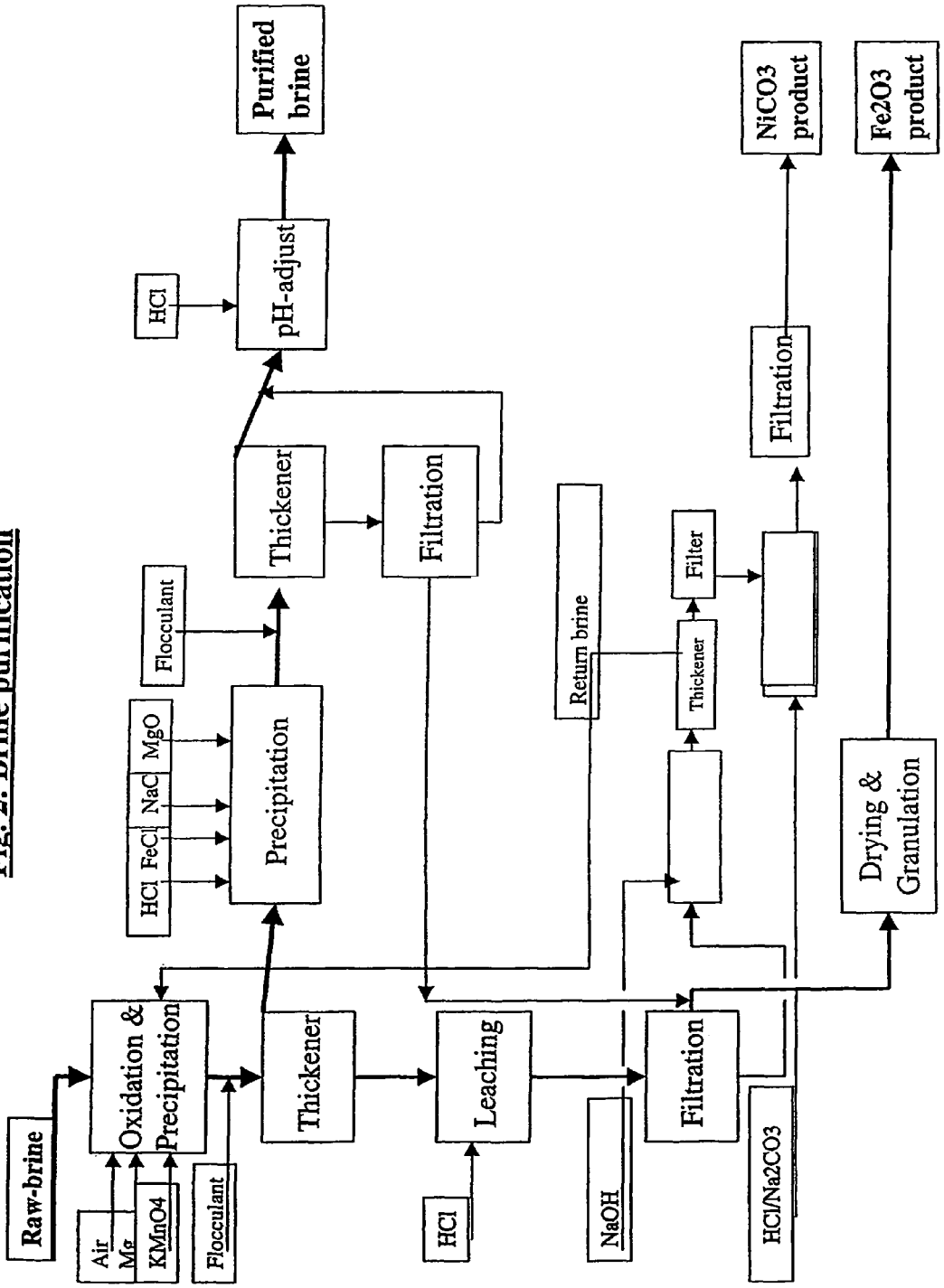
FIG. 2 Illustrates a process of brine purification.

For the process of the present invention the olivine particles should have a suitable particle size, preferably below 1 mm in diameter. Suitable olivine may be obtained from various sources in the world, e.g. in Norway, Greenland and North-America. Raw olivine mineral is ground substantially to the suitable size by conventional methods, such as by milling in a cone crusher and/or disk mill, and the material may optionally be fractioned to obtain a more homogeneous size distribution. The raw olivine may contain other minerals, but preferably below 10%.

The manner in which olivine is dissolved in mineral acid is a key factor in controlling the specific surface area of the produced silica. Several embodiments for dissolving the olivine in mineral acid have been tested and compared in a controlled manner. The phrase "dissolving in a controlled manner" means in this context to control and keep within suitable limits at least parameters including acid concentration, leaching temperature, and period of time for which the olivine is leached in the acid. Preferably the rate at which olivine is added to the acid solution is controlled, as well as the temperature of the acid at the time of addition.

The temperature of the acid solution is preferably in the range of about 50-110° C., when the addition of olivine is started, such as in the range of about 80-110° C. or in the range of about 90-105° C. The dissolution of olivine in acid is exothermic which will result in a temperature increase of the reaction mixture, unless very efficient cooling is employed. The rate of temperature increase is dependent on several factors, as for example the grain size of the olivine used, the concentration of the acid and the ratio of olivine to acid. The acid concentration should be as high as possible in order to have an economic process for brine handling, for all water must later on be evaporated. Therefore, when the requirement to the silica surface is reduced, the acid concentration might be as high as 36%. Reactors operating under pressure and higher temperature can also be used. The total reaction time is preferably in the range of 0.2-6 hours, and more preferably in the range of 0.5-2 hours.

After the olivine-silica slurry has been heated for the determined period of time, undissolved olivine and insoluble minerals should be separated from the slurry. This may be readily accomplished by allowing the slurry to sediment for a brief period of time, about 0.1 to 5 minutes. The bulk of the slurry liquid can then be separated from the sediment, e.g. by suctioning or decanting. These particles separated from the silica slurry are the main component in the sand product. Longer sedimentation time will result in more loss of silica, since part of the silica will also sediment together with the mineral impurities. Alternatively, a hydro cyclone of suitable dimensions can be used for this purpose, or other conventional equipment suitable for separation of coarse particle material from finer particles. Most of the coarse grained mineral impurities, consisting of un-dissolved olivine and insoluble minerals, are separated in this way from the bulk of the silica. However, fine-grained mineral impurities are not separated effectively from the bulk of the silica in this way.

The silica slurry is filtered to separate from it dissolved metal salts and other impurities, with conventional filtering techniques and the silica filter cake is washed with aqueous washing liquid (typically water) until suitable purity. (For further treatment of the filter cake, see the 2004 0167 application.) The rest of the sand product is coming from the following separation step in the silica process where centrifuge, hydro cyclone or another settling/thickener device is used to get the fine-grained particles of mineral impurities out from the silica product (cf. FIG. 1). Both sand products may be treated separately or together.

The solution from the separation step where the silica is removed from the solution will mostly hereafter be called the brine. pH(dir) refers to the value measured directly in the current solution at the current temperature, using an electrode without temperature sensor. pH(1:10) refers to the value measured after diluting the brine with water in the ratio 1:10 by volume. The brine is purified by a process where the first step is oxidation by air (also hypo chlorite, chlorine, peroxide or similar can be used) and $KMnO_4$. The air oxidation is carried out using a fast rotating unit to disperse the gas. The pH is adjusted by use of MgO. Also other bases can be used, but MgO is preferred in order to get as high Mg concentration as possible. A temperature of 80-90° C. is intended for the tanks. The pH(dir) should lie around 5 for both tanks, achieved by addition of MgO. The iron content in filtered brine will then be reduced to approx. 1 ppm Fe (limit set to max. 7 ppm). The nickel content will be typically 0.5-2.5 ppm out of the second tank. This is not low enough (<0.3 ppm); additional Ni removal is therefore required (Ni polishing step). A significant reduction of manganese is also observed during tests without adding $KMnO_4$. However, to reach acceptable Mn levels (<15 ppm) addition of $KMnO_4$ equivalent to the total Mn, the manganese content will be reduced to below 5 ppm.

Prior to settling, flocculant may be added, and the precipitated product containing Fe and Ni are removed by thickener and/or filters. Before the final Ni polishing step, the brine might be evaporated in order to get even better conditions for the last Ni removal step. The brine should be evaporated from 20-25% to $MgCl_2$ concentration of 32-35%. In order to remove the rest of the Ni, a polishing step is conducted where the brine is acidified by HCl, and $FeCl_3$ is added together with MgO and NaCl in order to get correct pH and composition of the brine with respect to later utilisation for Mg production. The retention time for each of the 3 applied precipitation tanks is 20 minutes. Because external MgO that might contain too much sulphate is used, sulphate can be removed as well by use of strontium chloride to precipitate the sulphate as strontium sulphate. The solids in the brine from the precipitation process is taken out by use of addition of flocculent, thickener and a belt filter. Only 5% of the total flow is going through the filter. The filter cake is mixed with the iron product, see below. The filtrate from the filter and the overflow from the thickener are going together to tank where the brine is neutralised to a pH (1:10) of 6.5-7 before it is utilized in a plant for production of magnesium. If the brine is going to be used for road salt, the last Ni removal step (from 2.5 to 0.2-0.3 ppm) is not required. The final level of Ni here is depending on if evaporation is carried out or not.

If the Fe/Ni hydroxide precipitate from the separation process above has to be separated in two products, the precipitate can be treated in two different ways: 1) leaching the sludge after flocculation and settling, or 2) filtering and washing, after which the washed cake is leached. If the Fe/Ni precipitate shall not be separated into two products, the mixture will be filtered and a similar Fe product containing more Mg and Ni will be produced.

By leaching, the Fe/Ni precipitate is partly solved in a reactor (leaching of sludge where HCl is used to produce a slurry of a pH(dir) of 2). The temperature during leaching should be about 80° C. A residence time of approximately one hour is required before the filtration.

Leaching of settled sludge is from an economic point of view the best solution. For sludge leaching no water needs to be added beyond that present in the acid. A rather large volume of filtrate has to be returned in the process. Only one filtration is required, while leaching of washed cakes requires filtration before and after leaching.

Leaching washed Fe/Ni hydroxide cakes gives extract with a mole ratio Mg/Ni of about 12. If nickel could be selectively separated from this solution, only one Ni precipitation step is needed. Precipitation as carbonate in leaching extract from Fe/Ni sludge, which has an Mg/Ni ratio of about 50, does not have any advantages over hydroxide, while in chloride solutions in the second precipitation step, with mole ratio Mg/Ni of 0.2-0.3, the carbonate precipitation is excellent compared to hydroxide. Tests are carried out, and in Example 3 all details regarding carbonate precipitation are presented.

The filter cake is washed and mixed with the filter cake from the final Ni polishing step before this cake is made into small granules (30-50 mm) in the granulator before drying, where dried particles are produced for sale. These particles are the Fe-product (for instance $Fe_2O_3$). There is some nickel in this dried product. The drying/granulation process for the Fe product can be carried out in a disk, in a fluidised bed, or in a drum dryer where very high temperatures up to 1000° C. can be used to get the product burned or it can be done mechanically at lower temperatures.

If the Fe/Ni product shall not be separated into two products, the mixture will be treated in the same way as the Fe filter cake and a product similar to the Fe product will be produced.

Both hydroxides and carbonates can be used. Tests show that precipitating nickel in the leaching extract as hydroxides gives the best results, and hydroxides are therefore used as the main concept. The tests also show the effect of brine concentration on the settling and filtration properties, see Example 3.

The composition of solution in which the second precipitation will take place is governed by the composition of the filter cake. A solution with 2% Ni or higher Ni concentrations is provided for the second precipitation step.

Precipitation of Ni hydroxide in sulphate solutions is one option. Filter cakes from the first Ni hydroxide precipitation step are dissolved in $H_2SO_4$. The separation of Mg is at least as good as precipitating in chloride solutions, and the Cl content is low, 0.03% Cl.

Figure 3:
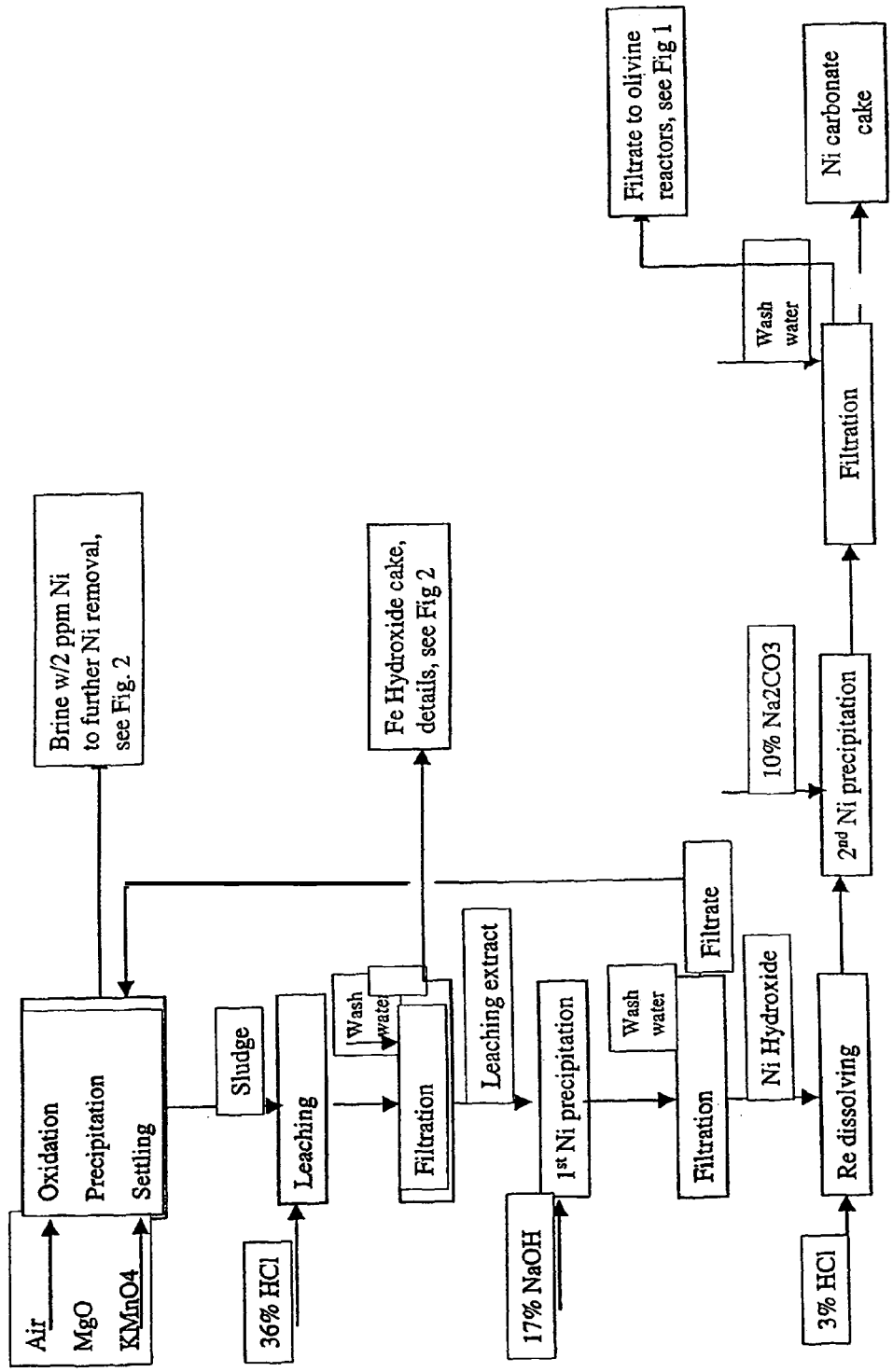
FIG. 3 Shows in more details separation of Fe and Ni compounds from the brine.

This alternative results in less pure product and the filterability is poorer compared to carbonate. Consequently, dissolution in HCl and precipitation as carbonate is recommended for this process step, see FIG. 3.

Precipitation as Ni carbonate can be done either by use of $Na_2CO_3$ or other carbonates or by use of $CO_2$ gas. Dispersing $CO_2$ gas three times the stoichiometric amount (related to NaOH) and adding stoichiometric amounts of NaOH results in an equal Ni reduction and an equal composition of the precipitate as with the $Na_2CO_3$ addition. The filterability, however, is significantly reduced, and $Na_2CO_3$ is therefore considered as the main alternative.

Example 1

Oxidation/Precipitation of Iron, Nickel and Manganese

Olivine raw brine containing 22% $MgCl_2$, 1.0% Fe, 0.05-0.06% Ni, and 1.2% HCl was treated with air and $Mg(OH)_2$ pulp was added in various ratios to see to which extent the elements were precipitated as a function of pH. The results showed that divalent iron is easily oxidised by air at an average residence time of 50 minutes and an airflow corresponding to 3.6 times the stoichiometric amount in relation to $Fe^{2+}$.

By adding base just below that corresponding to complete oxidation and precipitation of Fe hydroxide, the main compound formed was hematite, $Fe_2O_3$. By increasing the base, the more complex phase iowaite, $Mg_4Fe(OH)_8OCl \cdot xH_2O$ (or related phases), was formed.

Figure 4:
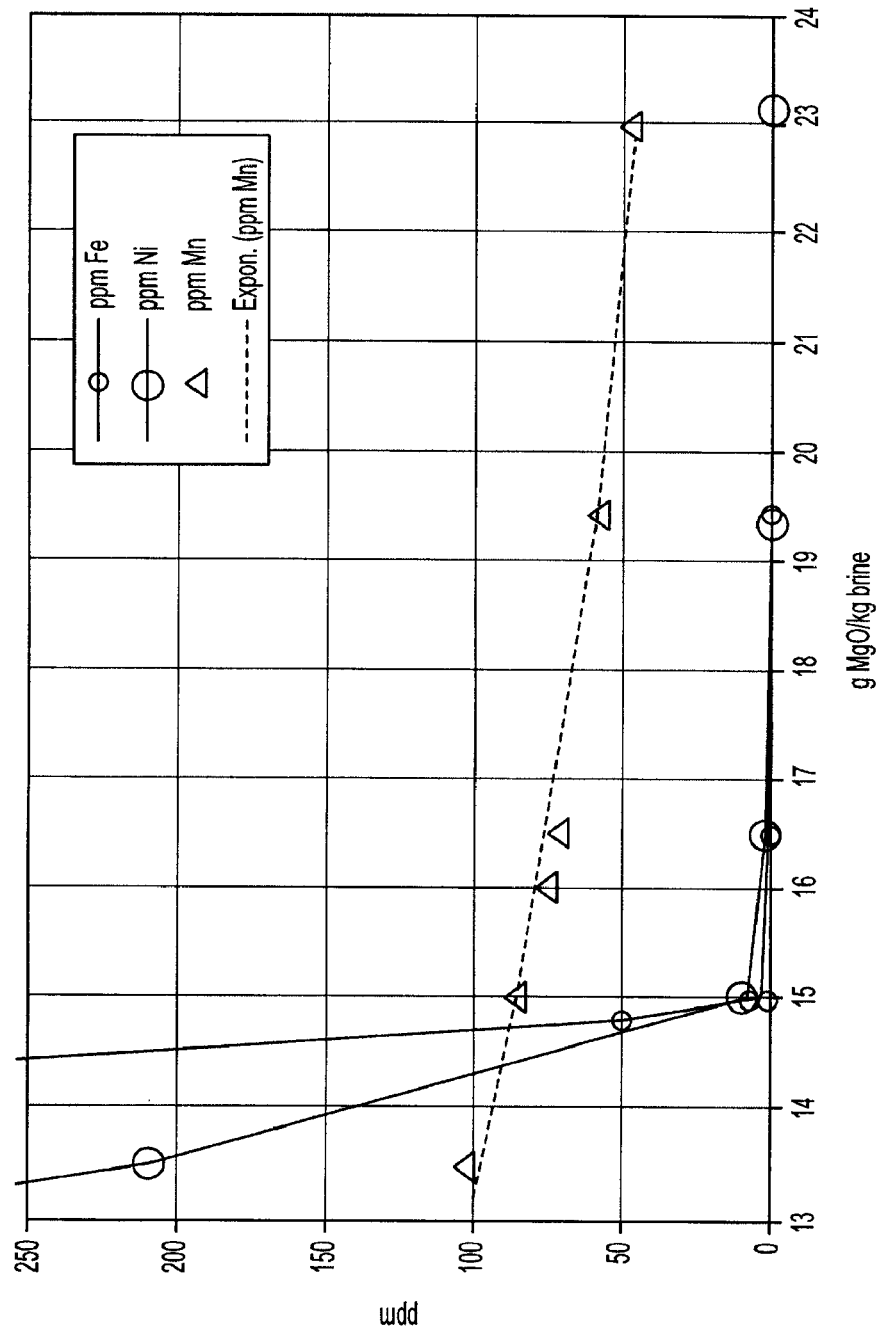
FIG. 4 Shows Fe, Ni, and Mn in filtered samples from Tank 1, concentration (ppm) as a function of pulp addition (pulp as g MgO/kg brine), in Example 1.

A marked reduction of the nickel content was observed, from 0.057% Ni to below 1 ppm Ni, and near the required 0.3 ppm Ni. Then the Fe/Ni mole ratio in the precipitate was lower than 20. A certain reduction of manganese was also observed. Depending on the base addition, the manganese was reduced from 117 to 58 ppm Mn. The results are graphically presented in FIG. 4.

An experiment with $KMnO_4$ addition was carried out. Now the pulp flow was kept at 16.0 g MgO/kg brine. An inlet stream of $KMnO_4$ equivalent to 115 ppm $Mn^{2+}$ was added to Tank 2, i.e. near the total concentration of Mn in the brine. Later the $KMnO_4$ addition was further increased by 10%. 4.5 hours after the streams were stabilised (90% replacement in Tank 3), samples were withdrawn for analysis. Approximately 2.5 hours after increasing the $KMnO_4$ flow, new samples were taken. As seen in Table E1, adding $KMnO_4$ equivalent to the total Mn content results in a significant reduction of Mn.

TABLE E1

Analysis results, $KMnO_4$ addition

| g MgO/kg brine | KMnO4 eq. to ppm Mn | Tank | pH(1:10) | ppm Fe | ppm Ni | ppm Mn | ppm Si (uncertain) |
|---|---|---|---|---|---|---|---|
| 16.0 | 115 | 1 | 8.29 | ≦1 | 4.4 | 72 | <1 |
|  |  | 2 | 8.77 | ≦1 | 1.4 | 7 | 3-4 |
|  |  | 3 | 8.98 | ≦1 | 0.52 | 14 | 3-4 |
| 16.0 | 127 | 1 |  | 4 | 6.1 | 75 | <1 |
|  |  | 2 |  | ≦1 | 0.9 | 1.5 | 3-4 |
|  |  | 3 |  | ≦1 | 0.57 | 5 | 6 |

Example 2

Precipitation of Ni in Extract from Leaching Fe—Ni Sludge

Figure 5:
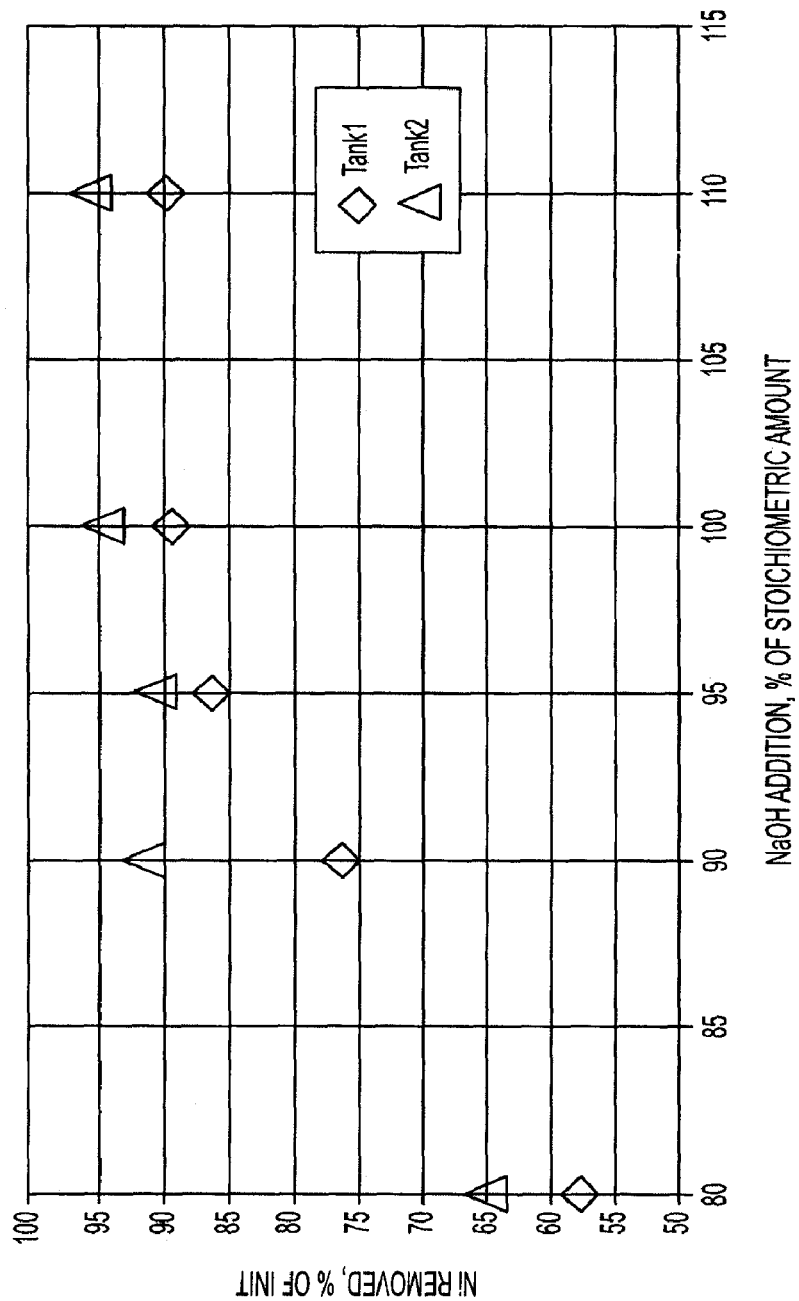
FIG. 5 Shows Ni in liquid phase as a function of base addition in Example 2.

A batch of synthetic brine containing 25% $MgCl_2$ and 0.38% Ni was prepared. This solution was used in an experiment with continuous precipitation in two 500-ml tanks. The residence time was 15 minutes per tank. Brine and 17% NaOH were fed to the first tank.

pH(dir) in the first tank varied between 5.5 and 5.8. The Ni concentrations in filtered samples decreases with increasing NaOH addition, and flatten out around 0.02% Ni (FIG. 5). There was a tendency for decreasing Cl in the precipitate with increasing base addition, indicating that Cl is replaced with OH. At the same time, there was a tendency for increasing Mg content; however, not as high as that measured when precipitating Ni hydroxide in the less concentrated leaching extract (3% $MgCl_2$ and 0.15% Ni) based on washed Fe—Ni cakes.

It was of interest to look closer into the effect of brine concentration on the settling and filtration properties; especially since the $MgCl_2$ concentration of the leaching extract must be assumed to vary in the process. Three batches of synthetic brine containing 20, 24, and 28% $MgCl_2$ respectively were prepared. All of them contained 0.32% Ni. 17% NaOH equivalent to 0.32% Ni was fed. pH(dir) measured directly in the hot slurry varied in the range 5.4-6.0.

TABLE E2

Results from precipitation in brine at concentrations of 20-28% MgCl2; comparison other results.

| Brine | Precipitation | | | | Settling, 10 min | | Filter test | | |
|---|---|---|---|---|---|---|---|---|---|
| | % Ni liq. phase | | Ni removed, % | | sludge | upper phase | Filterability | f. cake | moisture |
| % MgCl2 | Tank1 | Tank2 | Tank1 | Tank2 | vol % | % Ni | m3/m2*h | mm | wt % |
| 28 | 0.074 | 0.035 | 77 | 89 | 5 | 0.068 | 9-10 | 7-8 | 64.2 |
| 24 | 0.046 | 0.026 | 86 | 92 | 8 | 0.026 | 18 | 8 | 70.0 |
| 20 | 0.030 | 0.020 | 91 | 94 | 14 | 0.022 | 8 | 9 | 76.6 |
| 25 | 0.048 | 0.028 | 83 | 90 | 5 | | 21 | 8 | |
| 14 | | | | | 18 | | 0.3-1 | ~4 | |
| 3 | | | | | | | | | |
| 0.5 | | | | | | | 0.5 | 1.4 | 80 |
| 0.06 | | | | | ~60 | | 0.3-0.4 | 2.3 | |

| Brine | Filter cakes | | | | |
|---|---|---|---|---|---|
| | XRF | | | mole ratios | |
| % MgCl2 | % NiO | MgO | Cl | Mg/Ni | Cl2/Ni |
| 28 | 58 | 8 | 14 | 0.26 | 0.25 |
| 24 | 64 | 6 | 11 | 0.17 | 0.18 |
| 20 | 65 | 8 | 8 | 0.23 | 0.13 |
| 25 | 63 | 6.1 | 11.8 | 0.18 | 0.20 |
| 14 | 84 | 7.7 | 8.1 | 0.17 | 0.10 |
| 3 | 55 | 15 | 4 | 0.51 | 0.08 |
| 0.5 | 70 | 3 | 2.7 | 0.08 | 0.04 |
| 0.06 | 72 | 0.4 | 2.4 | 0.01 | 0.04 |

As one can see Table E2, the brine concentration influences the properties of the precipitate rather strongly. Increasing the concentration leads to a more dense precipitate, with less moisture, and less sludge volume upon settling more concentrated solutions leads to more suspended particles in the upper phase. The composition of the precipitate does not vary significantly. Seen from the other side, the precipitate and sludge become more and more voluminous with decreasing brine concentration, especially when comparing with the very diluted solutions (from leaching washed Fe/Ni cakes), and the filterability decreases dramatically. There seems to be an optimum in filterability around 25% $MgCl_2$ and, which is surprising, the Mg concentration of the precipitate does not increase with increasing brine concentration. A certain increase in Cl with increasing brine concentration is indicated. Magnesium and chlorine in the precipitate seems to be unavoidable, and these elements have to be removed through re-dissolution and re-precipitation. Precipitating Ni as hydroxide in 25% $MgCl_2$ solution by adding 100-110% of stoichiometric amounts of NaOH, related to Ni, results in a product containing typically 60% NiO, 7% MgO, and 10% Cl. Precipitating in a 25-% solution led to more dense solids, which settled to only 5% of its original volume within 10 minutes after adding flocculent. These solids also exhibited a dramatically improved filterability when comparing with diluted solutions; about 20 $m^3/m^2 \cdot h$ was measured when the cake thickness was 8 mm. Since the settling properties are good (sludge volume 5-10% of original volume), a first separation by settling could also be used here.

Filtration

Figure 6:
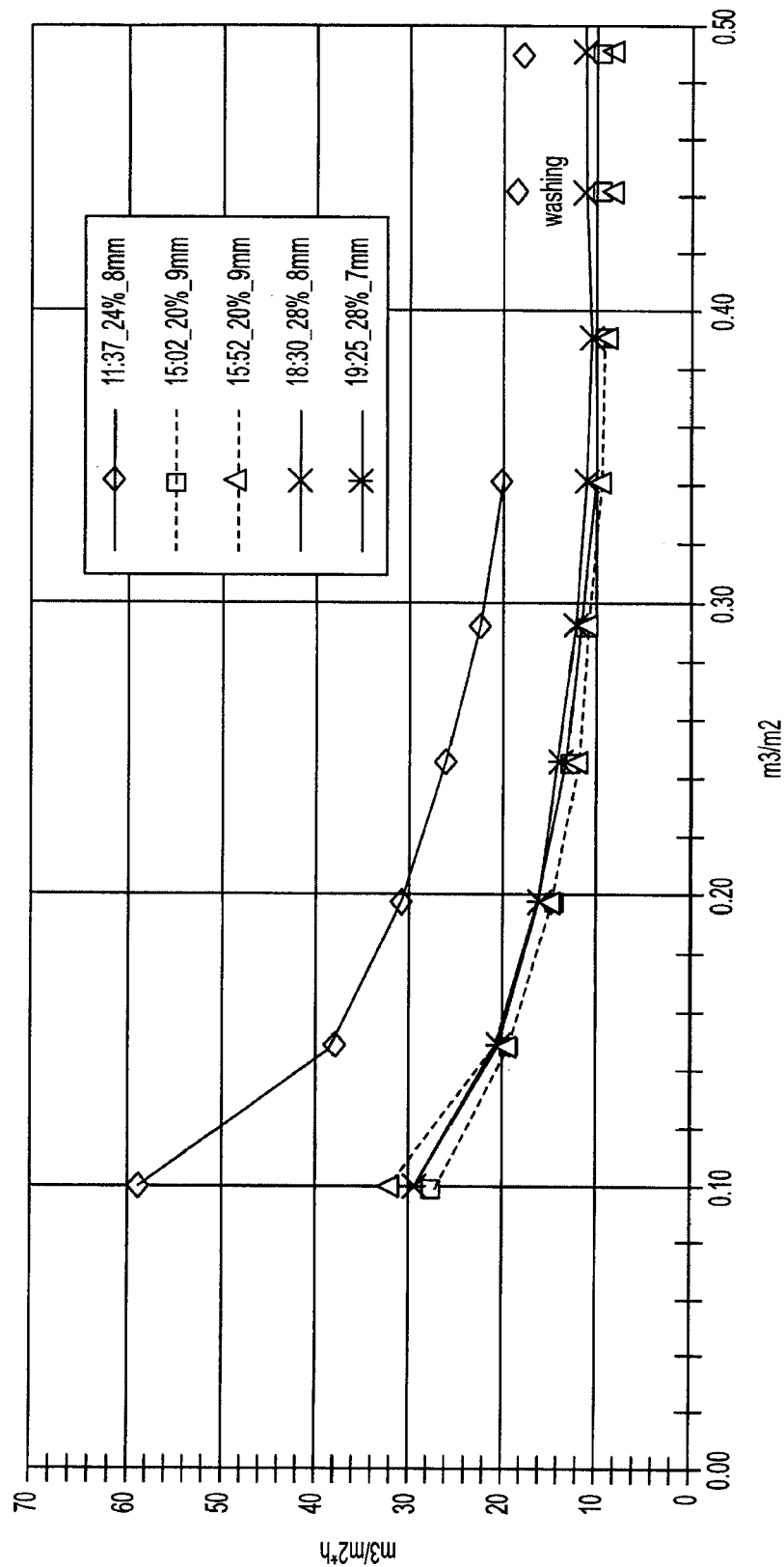
FIG. 6 Shows a filterability test; 400 ml slurry (80° C.) from Tank 2 taken during precipitation of Ni hydroxide in 20-28% $MgCl_2$ brine, in Example 2.

Results from five filtration tests (10 $cm^2$ filter), including replicates, show a filterability in the range 8 to 18 $m^3/m^2 \cdot h$ when the brine concentration varied from 20 to 28% $MgCl_2$ (FIG. 6). A cake thickness from 7 to 9 mm was measured.

Example 3

Precipitation of Ni Carbonate in Chloride Solutions

Several tests were carried out in order to check if nickel could be precipitated as carbonate. In some reference works the Ksp values for $MgCO_3$ and $NiCO_3$ are not very different, and it is not clear which of them is the lowest, i.e., which of the carbonates is likely to precipitate first.

By dissolution of Ni hydroxide from the first precipitation (in 25% leaching extract), a mole ratio Mg/Ni of 0.2 could be expected. In the following experiment one decided to use a more conservative value of 0.3, and a 10-kg batch with the following composition was prepared (added as chlorides): 2.0% Ni, 0.248% Mg–>mole ratio Mg/Ni=0.30

Figure 7:
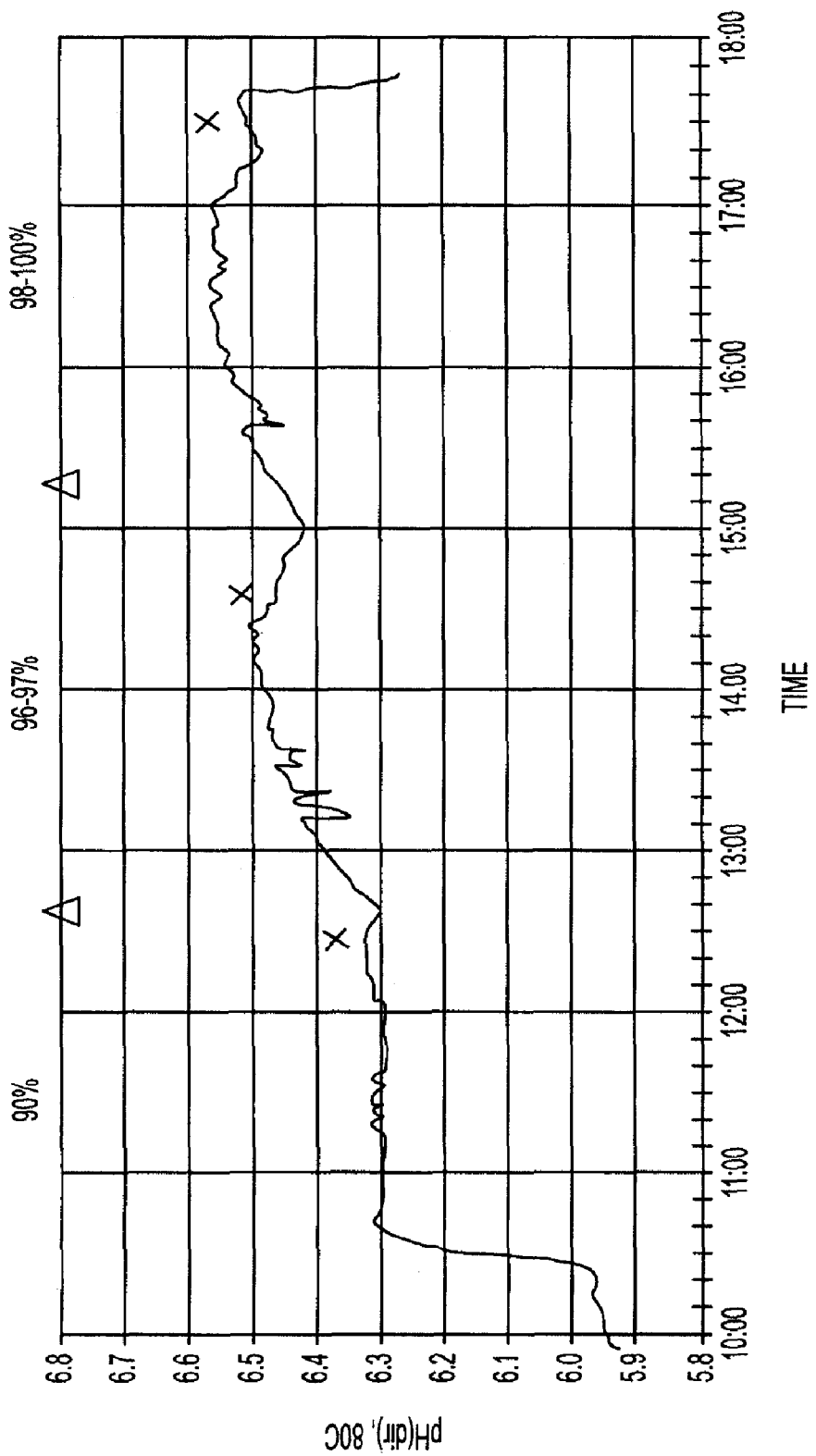
FIG. 7 Shows the pH in the first tank measured during precipitation of $NiCO_3$ with addition of $Na_2CO_3$ in the three steps from 90 to 100% of stoichiometric amount; x indicates sampling, in Example 3.

Two 500-ml reactors were placed on magnetic stirrers and the inlet streams of nickel solution and 10% $Na_2CO_3$ were started corresponding to a residence time of 27 minutes in each tank. A temperature of 80° C. was established as the tanks were filled. The $Na_2CO_3$ addition was increased from 90 to 100% of stoichiometric amount in three steps. FIG. 7 shows a pH (80° C.) in the three steps varying from 6.3 to 6.6. It is seen in Table E3.1 that nickel is removed according to the addition of $Na_2CO_3$, and the LOI value indicates that $NiCO_3$ is the phase formed. Quite small amounts of Mg and Cl were trapped in the precipitate. After allowing to stand for some hours, the precipitate had settled to approx. 30% of original volume (no flocculent).

TABLE E3.1

Precipitation of Ni with
Na$_2$CO$_3$ in chloride solution with 2% Ni

| time | Na2CO3 % of Ni | % Ni Tank1 | % Ni Tank 2 | Ni removal, % of init. Tank 1 | Ni removal, % of init. Tank 2 | wet cake % moisture | Dried f. cakes, XRF NiO | Dried f. cakes, XRF MgO | Dried f. cakes, XRF Cl | Dried f. cakes, XRF LOI |
|---|---|---|---|---|---|---|---|---|---|---|
| 11:25 | 90 | 0.201 | | 89.9 | | | | | | |
| 12:20 | | | | | | 74.4 | 63 | 0.2 | 0.2 | 36.4 |
| 12:35 | 90 | 0.204 | 0.158 | 89.8 | 92.1 | | | | | |
| 14:37 | | | | | | 74.6 | 63 | 0.3 | 0.1 | |
| 14:32 | 96-97 | 0.128 | 0.090 | 93.6 | 95.5 | | | | | |
| 17:20 | 98-100 | 0.128 | 0.074 | 93.6 | 96.3 | | | | | |
| 17:23 | | | | | | 74.8 | 63 | 0.4 | 0.1 | |

Figure 8:
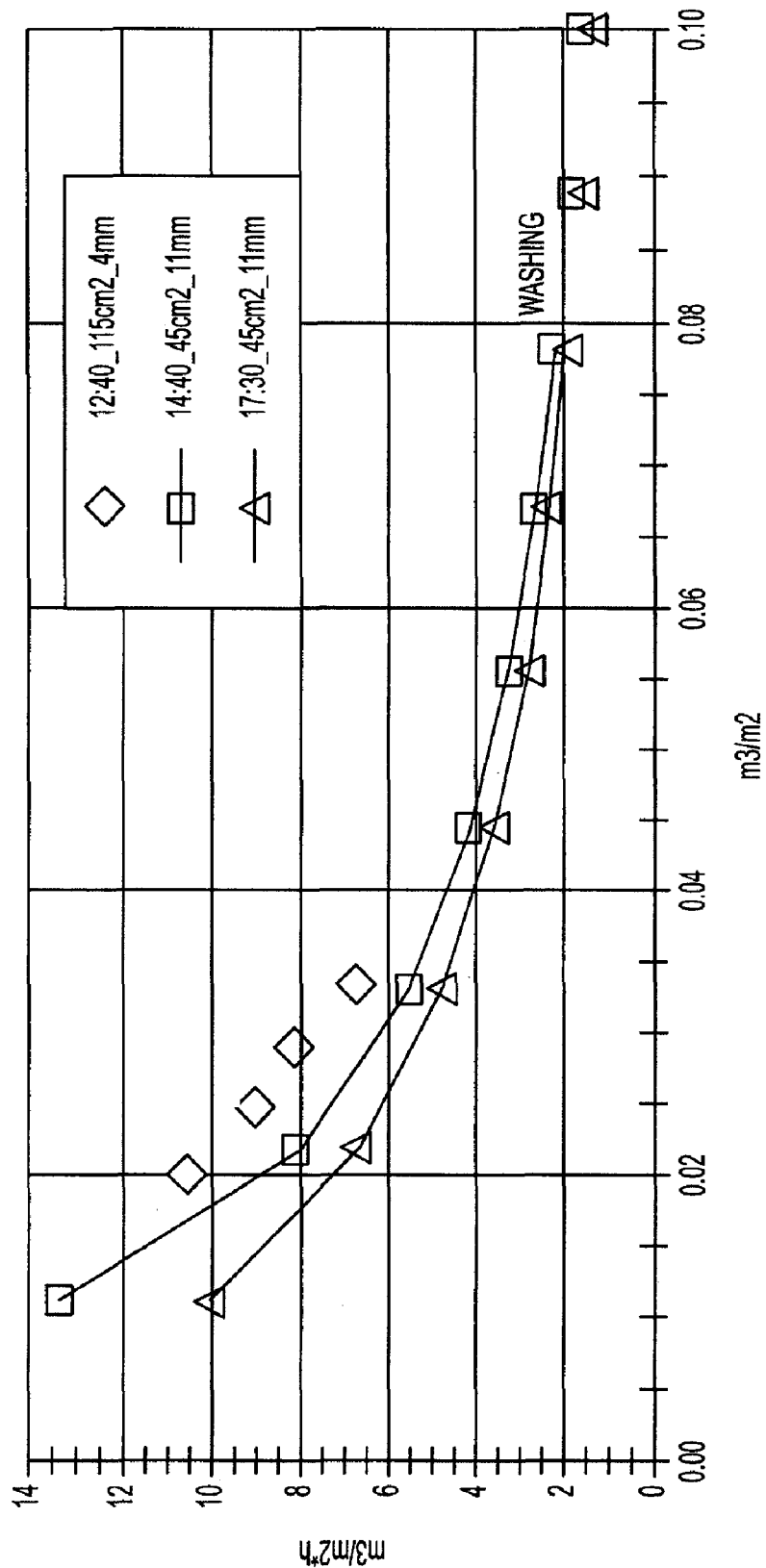
FIG. 8 Shows filterability of a 400 ml slurry after precipitation of nickel with $Na_2CO_3$ in Example 3.

Filterability:

400-ml samples were taken from the second tank for filterability tests. In the first step (90% Na$_2$CO$_3$ addition) a 115-cm$^2$ filter was used, resulting in a rather rapid filtration. In the two other steps, 45-cm$^2$ filters were used. The results from the three measurements are not very different, see FIG. 8, and a filterability of 2 m$^3$/m$^2$·h was measured when the cake thickness was 11 mm.

The Ni carbonate product was dried and the results are shown in Table E3.2.

TABLE E3.2

XRF analysis of Ni carbonate precipitate dried at 110° C.; comparison with Ni hydroxide in the 1st precipitation

| | 1st precip. hydroxide | 2nd precip. carbonate |
|---|---|---|
| NiO | 59.5 | 59 |
| MgO | 6.5 | 0.6 |
| Cl | 10.3 | 0.2 |
| MnO | 1.4 | 2 |
| CoO | 1.5 | 2 |
| SiO2 | 0.2 | 0.2 |
| ZnO | 0.7 | 0.7 |
| Al2O3 | 0.05 | <0.1 |
| Fe2O3 | 0.1 | 0.1 |

The invention claimed is:

1. A process for complete utilisation of olivine constituents, the process comprising the following steps:
   a) reacting olivine with up to 36 weight % HCl in a reactor, providing MgCl$_2$ brine, removing impurities,
   b) separating silica from the MgCl$_2$ brine and further treating the silica according to its applications,
   c) removing more impurity particles which together with impurities from the above reacting step, a) can be utilised as a sand product,
   d) oxidation of the brine by air and KMnO$_4$ or an oxidant other than KMnO$_4$ and correction of the pH,
   e) separating the brine and precipitated Fe and Ni compounds by means of adding flocculant prior to a suitable solid/liquid separation equipment,
   f) further purifying the MgCl$_2$ brine using trivalent Fe substance, thereby adjusting Fe/Ni ratio to be higher than 120, adding alkaline substance(s) and/or other chemicals to adjust the brine composition and pH, and separating the impurities by a suitable solid/liquid separation equipment to form a filter cake,
   g) adjusting the pH of the liquid resulting from step f) using HCl to produce purified MgCl$_2$ brine applicable for Mg production,
   h) leaching of the Fe and Ni precipitate from step e) using an appropriate acid, at a suitable temperature, to separate a Ni leaching extract from Fe solids,
   i) mixing the resulting Fe solids from the previous step h) with the filter cake from the purifying step f) followed by forming a Fe oxide product,
   j) adding alkalines to the Ni leaching extract from step h) adjusting the pH, and after separation of a Ni solid compound, returning the brine to step d),
   k) and finally re-dissolving the Ni solid compound, using an appropriate acid, and precipitate a Ni product as carbonate.

2. The process according to claim 1, wherein the alkaline substances are MgO, Mg(OH)$_2$, NaOH or KOH.

3. The process according to claim 1, wherein the HCl concentration used for the reactor is 18-22 weight %.

4. The process according to claim 1, wherein the appropriate acid in the steps h) and k) is HCl or H$_2$SO$_4$ is used for step k) instead of HCl.

5. The process according to claim 1, wherein all contaminated water from the various process steps and other solutions from the process are utilized as wash water, scrubber water or directly utilized to dilute the HCl to the-reactor.

6. The process according to claim 1, wherein the carbonate is used as a precipitation agent as an alternative to air oxidation in step d).

7. The process according to claim 1, wherein carbonate is used for pH adjustment and as precipitation agent instead of alkaline substances.

8. The process according to claim 1, wherein alkalines are used to get the Ni product as hydroxide instead of carbonate.

9. The process according to claim 1, wherein CO$_2$ is used in combination with an alkaline instead of carbonate in the Ni precipitation step, step k).

10. The process according to claim 1, wherein the MgCl$_2$ brine is evaporated to 30-35 weight % prior to the Ni polishing step, step f).

11. The process according to claim 1, wherein the product according to step i) can be dried, granulated or calcined.

12. The process according to claim 3, wherein the MgCl$_2$ brine is evaporated to 30-35 weight % prior to the Ni polishing step, step f).

13. The process according to claim 1, wherein correction of the pH in step d) is conducted by applying alkaline substance(s).

* * * * *